US009209492B2

(12) United States Patent
Baek et al.

(10) Patent No.: US 9,209,492 B2
(45) Date of Patent: Dec. 8, 2015

(54) BATTERY PACK

(75) Inventors: Woon-Seong Baek, Yongin-si (KR);
Dae-Geun Kim, Yongin-si (KR);
Heui-Sang Yoon, Yongin-si (KR);
Sang-Joo Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 1046 days.

(21) Appl. No.: 13/287,533

(22) Filed: Nov. 2, 2011

(65) Prior Publication Data

US 2012/0129014 A1 May 24, 2012

(30) Foreign Application Priority Data

Nov. 18, 2010 (KR) ........................ 10-2010-0115122

(51) Int. Cl.
*H01M 10/42* (2006.01)
*H01M 2/02* (2006.01)
*H01M 2/34* (2006.01)
*H01M 10/04* (2006.01)

(52) U.S. Cl.
CPC ........ *H01M 10/4257* (2013.01); *H01M 2/0267* (2013.01); *H01M 2/348* (2013.01); *H01M 10/04* (2013.01); *H01M 2200/103* (2013.01); *H01M 2200/106* (2013.01)

(58) Field of Classification Search
CPC .............. H01M 10/42; H01M 10/425; H01M 10/4257; H01M 10/5034
See application file for complete search history.

(56) References Cited

U.S. PATENT DOCUMENTS

| 2004/0038125 | A1* | 2/2004 | Kim et al. ...................... 429/162 |
| 2006/0093902 | A1* | 5/2006 | Lee ................. 429/130 |
| 2007/0099073 | A1* | 5/2007 | White et al. .................. 429/158 |
| 2008/0118825 | A1* | 5/2008 | Yoon ............................. 429/122 |
| 2009/0155631 | A1 | 6/2009 | Baek et al. |
| 2011/0076533 | A1* | 3/2011 | Choi ............................... 429/94 |
| 2011/0250475 | A1* | 10/2011 | Yamamoto et al. ............... 429/7 |

FOREIGN PATENT DOCUMENTS

| JP | 2002-298830 | 10/2002 |
| JP | 2003-346747 | 12/2003 |
| JP | 2004-014395 A | 1/2004 |
| JP | 2005-005138 | 1/2005 |
| KR | 10-2006-0028169 A | 3/2006 |
| KR | 10-2008-0039093 A | 5/2008 |
| KR | 10-2010-0070471 A | 6/2010 |

OTHER PUBLICATIONS

Korean Notice of Allowance dated Sep. 24, 2012.

* cited by examiner

*Primary Examiner* — Alix Eggerding
(74) *Attorney, Agent, or Firm* — Lee & Morse, P.C.

(57) ABSTRACT

A battery pack includes a bare cell that includes an electrode assembly, a case for accommodating the electrode assembly, and a cap plate arranged at one side of the case, a protection circuit board assembly for controlling charge/discharge of the bare cell, a battery protection device electrically connected to the protection circuit board assembly, and a first adhesive member. At least a part of the first adhesive member is disposed on the case. The first adhesive member crosses the battery protection device in a lengthwise direction of the battery protection device.

15 Claims, 10 Drawing Sheets

BATTERY PACK

BACKGROUND

1. Field

One or more embodiments relate to a battery pack, and more particularly, to the structure of a battery pack.

2. Description of the Related Art

Recently, portable electric/electronic apparatuses such as cellular phones, notebook computers, or camcorders that are compact and light have been actively developed and produced. The portable electric/electronic apparatuses include a battery pack so as to be operated in a place where no power source is provided. The battery pack adopts a secondary battery capable of charging/discharging to be economical. A typical secondary battery may be a nickel-cadmium (Ni—Cd) battery, a nickel-metal hydride (Ni-MH) battery, a lithium (Li) battery, or a lithium ion (Li-ion) battery. In particular, the operation voltage of a Li-ion battery is about three times higher than that of a Ni—Cd battery and that of a Ni-MH battery. Also, a Li-ion battery is widely used as a power source for a portable electronic apparatus due to its high energy density. A secondary battery uses a Li-based oxide as a positive electrode active material and a carbon-based material as a negative electrode active material.

In general, secondary batteries are classified into a liquid electrolyte battery and a polymer electrolyte battery according to the type of an electrolyte. A battery using a liquid electrolyte is referred to as a Li-ion battery and a battery using a polymer electrolyte is referred to as a lithium polymer battery. In a secondary battery, a bare cell formed by sealing an electrode assembly and a case accommodating an electrolyte may be electrically connected to a protection circuit board. The bare cell charges and discharges electricity according to a chemical reaction. The protection circuit board controls charge/discharge of a bare cell to prevent overcharge and over-discharge so that the bare cell may be protected.

SUMMARY

According to one or more embodiments of the present invention, a battery pack includes a bare cell that includes an electrode assembly, a case for accommodating the electrode assembly, and a cap plate arranged at one side of the case, a protection circuit board assembly for controlling charge/discharge of the bare cell, a battery protection device electrically connected to the protection circuit board assembly, and a first adhesive member, at least a part of which is disposed on the case crosses a lengthwise direction of the battery protection device.

A first end portion and a second end portion of the first adhesive member may be arranged on the case.

The first adhesive member may wind around the bare cell more than once.

The battery pack may further include a second adhesive member arranged on the bare cell crossing at least a part of the first adhesive member.

The second adhesive member may wind around the bare cell more than once.

A width of the second adhesive member may be greater than that of the first adhesive member.

The battery protection device may be disposed between the cap plate and the protection circuit board assembly.

The battery pack may further include a label sheet that winds around the bare cell to cover at least a part of the first adhesive member.

A direction in which the first adhesive member extends may be perpendicular to a lengthwise direction of the battery protection device.

The case may have prismatic shape in which a first side extends thereof longer than a second side thereof, and the battery protection device may extend in a direction in which the first side extends.

The battery pack may further include an insulation member between the battery protection device and the cap plate.

The battery pack may further include an electrode terminal that is electrically connected to the electrode assembly and disposed on the cap plate, wherein the battery protection device is a positive temperature coefficient (PTC) device that includes a first plate connected to the electrode terminal, a PTC main body connected to the first plate, and a second plate connected to the PTC main body and connected to the protection circuit board assembly. The second plate may include a first region extending from the PTC main body, and a second region extending from the first region by being bent from a lateral surface in a lengthwise direction of the PTC device, wherein the second region is connected to the protection circuit board assembly.

The battery protection device may be a temperature fuse.

The battery pack may further include an electrode terminal that is electrically connected to the electrode assembly and arranged on the cap plate, wherein one end of the battery protection device is connected to the electrode terminal and another end of the battery protection device is connected to the protection circuit board assembly, and the electrode terminal is connected to a negative polarity of the electrode assembly and one end of the protection circuit board assembly is connected to a positive polarity of the electrode assembly.

The first adhesive member may be a polyimide tape.

BRIEF DESCRIPTION OF THE DRAWINGS

The above and other features will become more apparent to those of ordinary skill in the art by describing in detail exemplary embodiments with reference to the attached drawings, in which.

DETAILED DESCRIPTION

Figure 1:
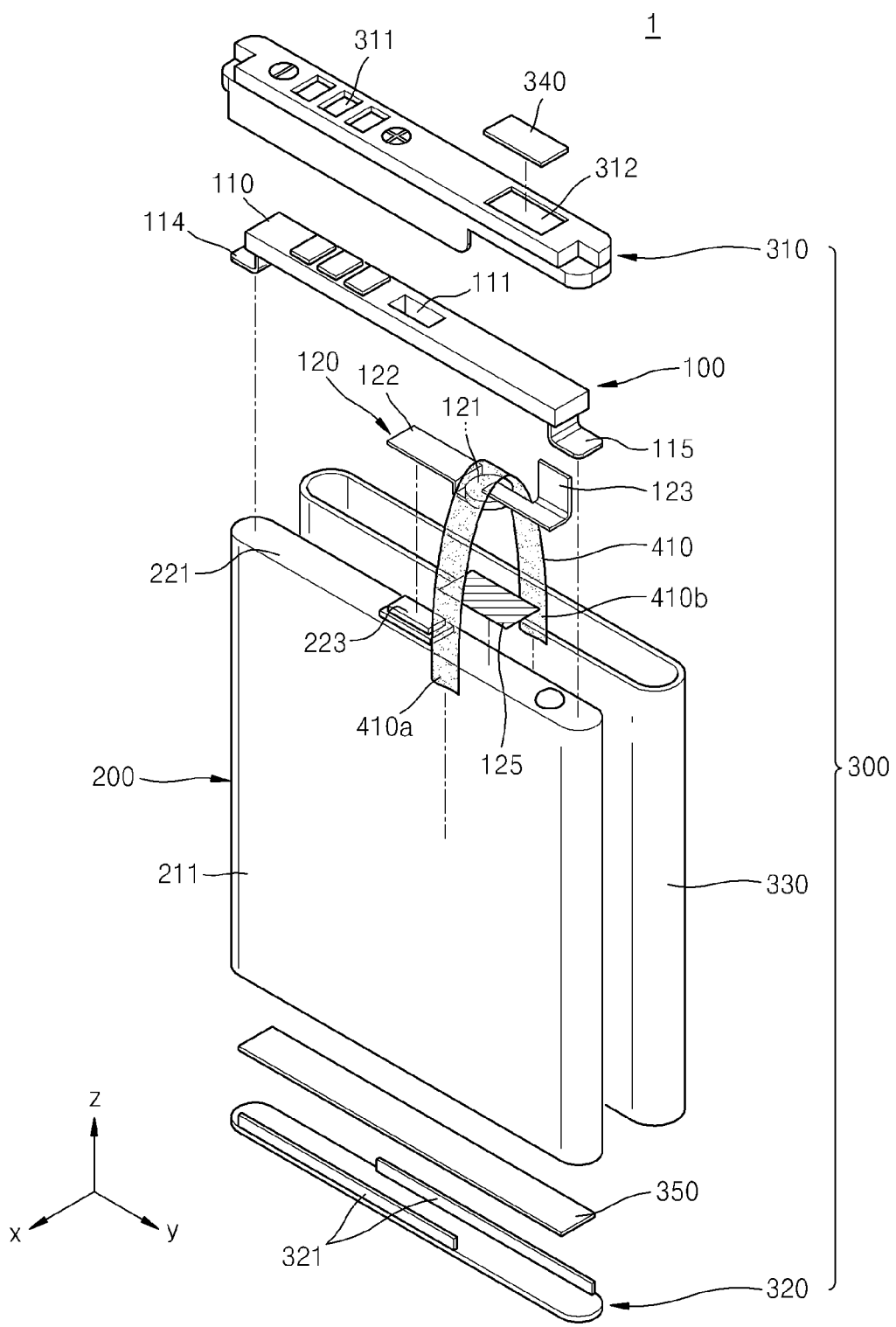
FIG. 1 illustrates an exploded perspective view relating to a battery pack according to an embodiment.

Korean Patent Application No. 10-2010-0115122, filed on Nov. 18, 2010, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

Figure 2:
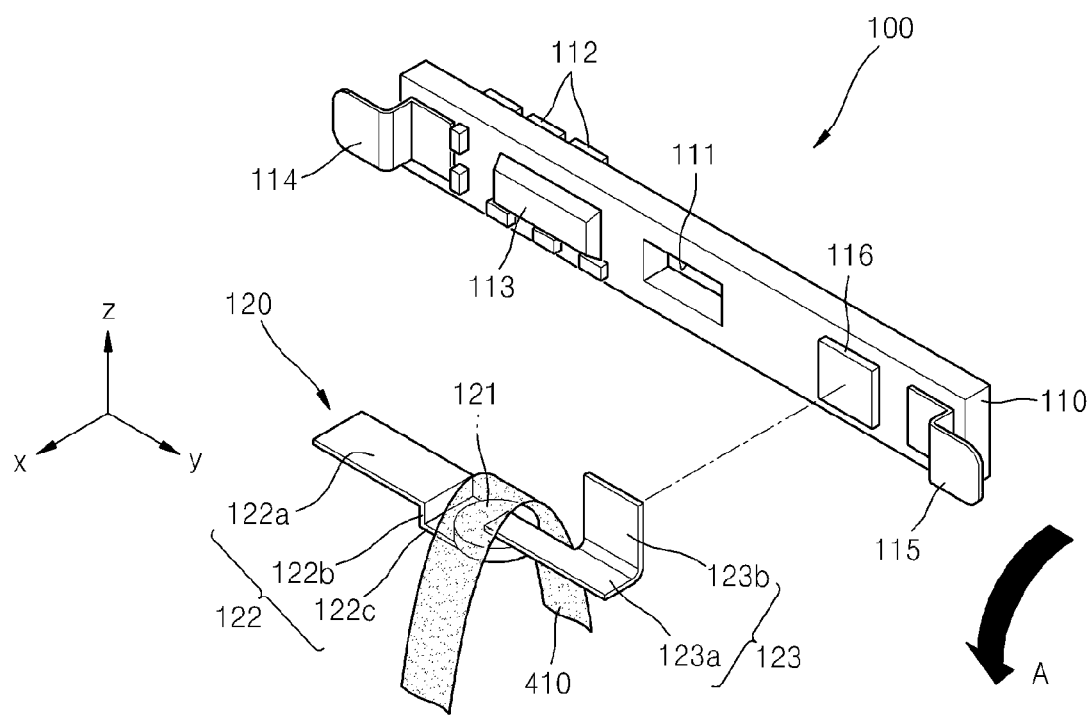
FIG. 2 illustrates an exploded perspective view relating to a positive temperature coefficient (PTC) device and a protection circuit board assembly.

FIG. 1 is an exploded perspective view illustrating a battery pack 1 according to an embodiment. FIG. 2 is an exploded perspective view illustrating the battery protection device 120 (shown in FIG. 2 as a positive coefficient (PTC) device) and the protection circuit board assembly 100. Referring to FIGS. 1 and 2, the battery pack 1 includes a protection circuit board assembly 100, a bare cell 200, and a cover 300.

The protection circuit board assembly 100 may include a protection circuit board 110 and a battery protection device 120. A welding portion 111 may be formed as a through hole in the protection circuit board 110. An external terminal 112 for transferring current to the outside may be mounted on a surface of the protection circuit board 110. Various electric components 113 may be mounted on another surface of the protection circuit board 110. Leads 114 and 115 may be arranged at end portions of the other surface of the protection circuit board 110. The leads 114 and 115 may be bent for welding and exposed to the outside of the protection circuit board 110

The battery protection device 120 functions as a safety apparatus that cuts off a supply of current when the temperature of the bare cell 200 increases due to an overcurrent. The battery protection device 120 may be, for example, a positive temperature coefficient (PTC) device or a temperature fuse. The battery protection device 120 may be referred to as a secondary protection device, to be distinguished from a first protection device provided in the bare cell 200.

When the battery protection device 120 is a PTC device, the PTC device may include a PTC main body 121, a first plate 122, and a second plate 123. The first plate 122 may be connected to one surface of the PTC main body 121, and the second plate 123 may be connected to another surface of the PTC main body 121. The PTC main body 121 may be manufactured by distributing conductive particles over crystalline polymers. The conductive particles may be carbon particles, and the crystalline polymers may be a synthetic resin such as a polyolefin-based resin. In the PTC main body 121, when the temperature of the PTC main body 121 is lower than a predetermined temperature, the conductive particles in the PTC main body 121 keep in electrical contact with each other, and thus, current may flow between the first plate 122 and the second plate 123. If an overcurrent or an overvoltage is applied, or if a consumption power increases when operating a battery, the temperature of the battery may become higher than the predetermined temperature. If the temperature of the battery becomes higher than the predetermined temperature, the crystalline polymers of the PTC main body 121 expand and thus the conductive particles become separated from each other. Accordingly, resistance drastically increases and thus, flow of current is cut off or a relatively small amount of current flows. Thus, the PTC main body 121 may function as a safety apparatus to prevent damage to a battery. Thereafter, when the PTC main body 121 has cooled to a temperature below the predetermined temperature, the crystalline polymers contract and the conductive particles are reconnected to each other and thus, current may flow therethrough.

Referring to FIGS. 1 and 2, the first plate 122 may include a first region, referred to herein as "1a region" 122a, a second region, referred to herein as a "1b region 122b", and a third region, referred to herein as "1c region 122c." The 1a region 122a and the 1c region 122c may be parallel to a plane X-Y, and the 1b region 122b may be parallel to a plane X-Z. The 1a, 1b, and 1c regions 122a, 122b, and 122c may form a bent portion. The 1a region 122a may be connected to an electrode terminal 223 by welding. The welding method may be, for example, resistance welding or spot welding, but the welding method is not limited thereto. Also, the connection method between the 1a region 122a and the electrode terminal 223 is not limited to welding. Although the structure of the first plate 122 according to an embodiment is described, the structure of the first plate 122 is not limited to what is shown in FIG. 1 or 2. For example, the first plate 122 may be a flat plate having no bent portion. Also, the bent portion of the first plate 122 may have a variety of bent shapes.

The second plate 123 may include a first region, referred to herein as "2a region 123a" and a second region, referred to herein as "2b region 123b." The 2a region 123a may be parallel to the plane X-Y, and the 2b region 123b may be parallel to a plane Y-Z. The 2a region 123a may be connected to the PTC main body 121. The 2b region 123b may be electrically connected to the protection circuit board assembly 100. For example, the 2b region 123b may be connected to a conductive layer 116 formed on the protection circuit board 110. The 2b region 123b may be connected to the conductive layer 116, for example, by welding. For example, the 2b region 123b may be connected to the conductive layer 116 by spot welding. However, the welding method is not limited thereto. When an upper cover 310 is arranged over the bare cell 200 after the 2b region 123b is connected to the conductive layer 116, the 2b region 123b may be elastically bent. That is, when the protection circuit board 110 on the plane Y-Z is bent onto the bare cell 200 on the plane X-Y, the 2b region 123b may be bent onto the 2a region 123a along a direction of an arrow A shown in FIG. 2.

The battery protection device 120 may also be a temperature fuse. For example, a Pb—Sn—Bi alloy or a Pb—Sn—In alloy may be used for the temperature fuse. The main component of the temperature fuse may be tin (Sn), zinc (Zn), or lead (Pb). The temperature fuse may cut off current when the temperature thereof drastically increases due to an overcurrent, an overvoltage, or an external short-circuit. For example, the battery protection device 120 may be the temperature fuse.

An insulation member 125 may be located between the battery protection device 120 and a cap plate 221 of the bare cell 200. The insulation member 125 may be, for example, insulation tape. The insulation member 125 may be located to prevent a short-circuit from being generated when the first plate 122 or the second plate 123 contacts the cap plate 221, because the case 211 and the electrode terminal 223 may have an opposite polarity. For example, a case 211 of the bare cell 200 and the cap plate 221 may have a positive polarity when connected to a positive electrode of an electrode assembly (not shown) and the electrode terminal 223 may have a negative polarity when connected to a negative electrode of the electrode assembly.

The battery protection device 120 for determining whether to cut off supply of current according to the temperature of the bare cell 200 should accurately measure the temperature of the bare cell 200. To this end, the battery protection device 120 is arranged to firmly contact the bare cell 200. A firm contacting method will be described in detail below when describing a first adhesive member 410. The bare cell 200 may include the case 211, the electrode assembly, and the cap plate 221. The case 211 may have a rectangular shape as illustrated in FIG. 1. However, the present invention is not limited thereto and the case 211 may have a variety of shapes, such as, for example, a circular shape or a pouch shape. The case 211 may have an opening portion and may have the form of a metal container by using a processing method such as deep drawing. In addition, the case 211 itself may function as a terminal. The case 211 may include aluminum or an aluminum alloy. The case 211 may contain the electrode assembly and an electrolyte. The opening portion fabricated to be a pathway of the electrode assembly therein may be sealed by the cap plate 221. In the electrode assembly, a positive plate and a negative plate may be stacked with a separator interposed therebetween and rolled in a swirl to form a jelly roll shape. The positive plate may be connected to a positive tab, and the negative plate may be connected to a negative tab. The electrode terminal 223 may penetrate the cap plate 221 and may be connected to the negative tab or the positive tab. For example, when the electrode terminal 223 is connected to the negative tab, the electrode terminal 223 may have a negative polarity. The positive tab may be connected to the case 211 and thus the case 211 and the cap plate 221 connected to the case 211 may have a positive polarity.

The cover 300 may include the upper cover 310, a lower cover 320, and a label sheet 330. The upper cover 310 may be coupled to one surface of the bare cell 200, and the lower cover 320 may be coupled to another surface of the bare cell 200. Also, the label sheet 330 may be wound around the bare cell 200. The label sheet 330 may couple the upper cover 310 and the lower cover 320 to the bare cell 200 and may protect a lateral surface of the bare cell 200.

The upper cover 310 may internally accommodate the protection circuit board assembly 100. The upper cover 310 may be a plastic case formed by injection molding using a resin material such as polycarbonate. The upper cover 310 may protect the protection circuit board assembly 100 from an external shock and prevent short-circuits of the protection circuit board assembly 100. The inside of the upper cover 310 may support the protection circuit board assembly 100 to contact the bare cell 200 firmly. Accordingly, the protection circuit board assembly 100 may be prevented from being moved. Also, in the leads 114 and 115 soldered to the protection circuit board assembly 100 and soldered to the bare cell 200, an increase in contact resistance due to a shock may be prevented. Also, the upper cover 310 may prevent the increase in contact resistance by making the leads 114 and 115 firmly contact the bare cell 200. A terminal hole 311, through which the external terminal 112 of the protection circuit board assembly 100 is exposed, may be formed in the upper cover 310. A test sheet 340 may be attached to the upper cover 310, and a test sheet attachment portion 312 may be formed at a position corresponding to the test sheet 340.

The lower cover 320 may include a side rib 321 for supporting the bare cell 200. A double sided adhesive tape 350 may be disposed between the bare cell 200 and the lower cover 320 to attach the bare cell 200 and the lower cover 320 to each other. The label sheet 330 may wind around a lower end portion of the upper cover 310 and the side rib 321 of the lower cover 320, covering the side surface of the bare cell 200.

Figure 3:
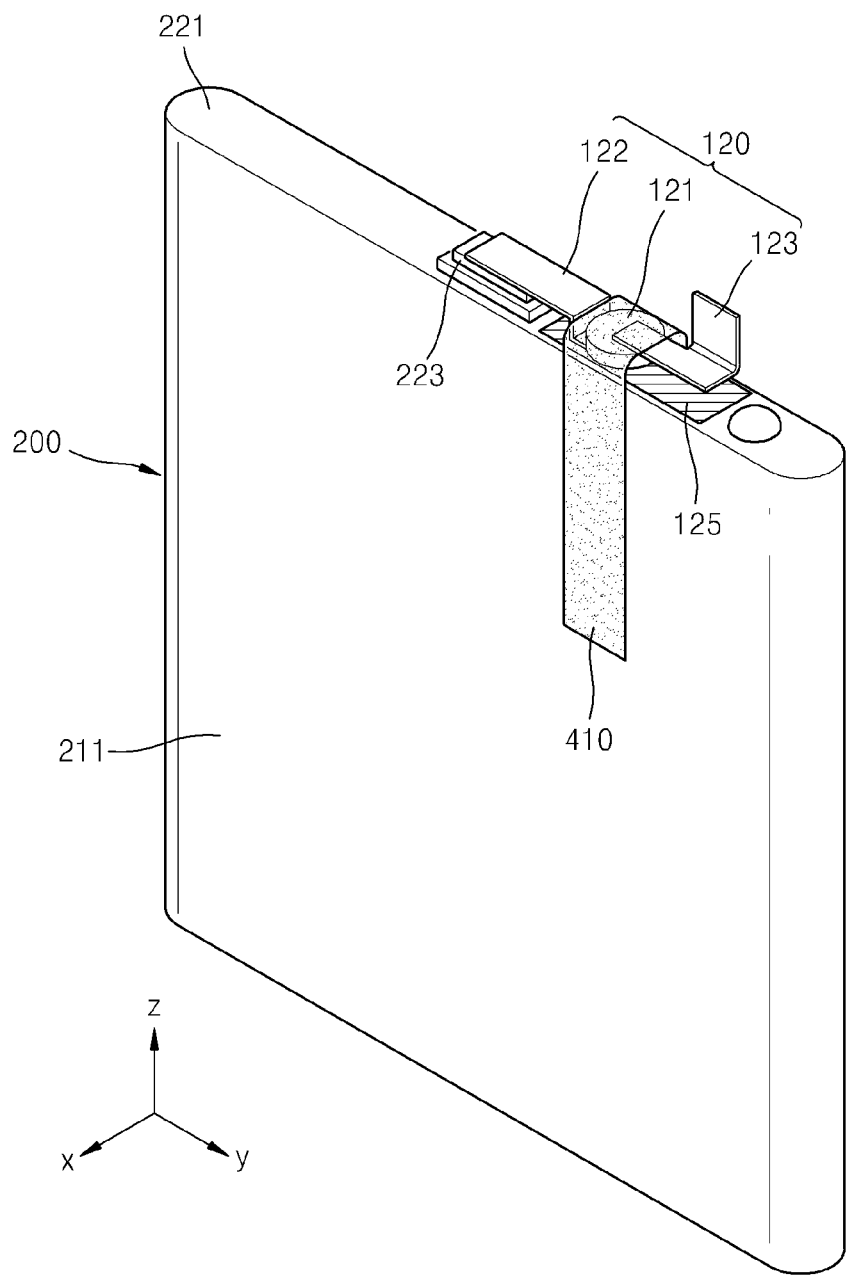
FIG. 3 illustrates a perspective view relating to a first adhesive member attached to a bare cell in which a PTC device is arranged, according to an embodiment.

FIG. 3 is a perspective view illustrating the first adhesive member 410 attached to the bare cell 200 on which the battery protection device 120 (such as, for example, a PTC device) is arranged, according to an embodiment. Referring to FIG. 3, the bare cell 200 and the battery protection device 120 of FIG. 1 are coupled to each other and the first adhesive member 410 of FIG. 1 is disposed on the battery protection device 120.

Figure 4A:
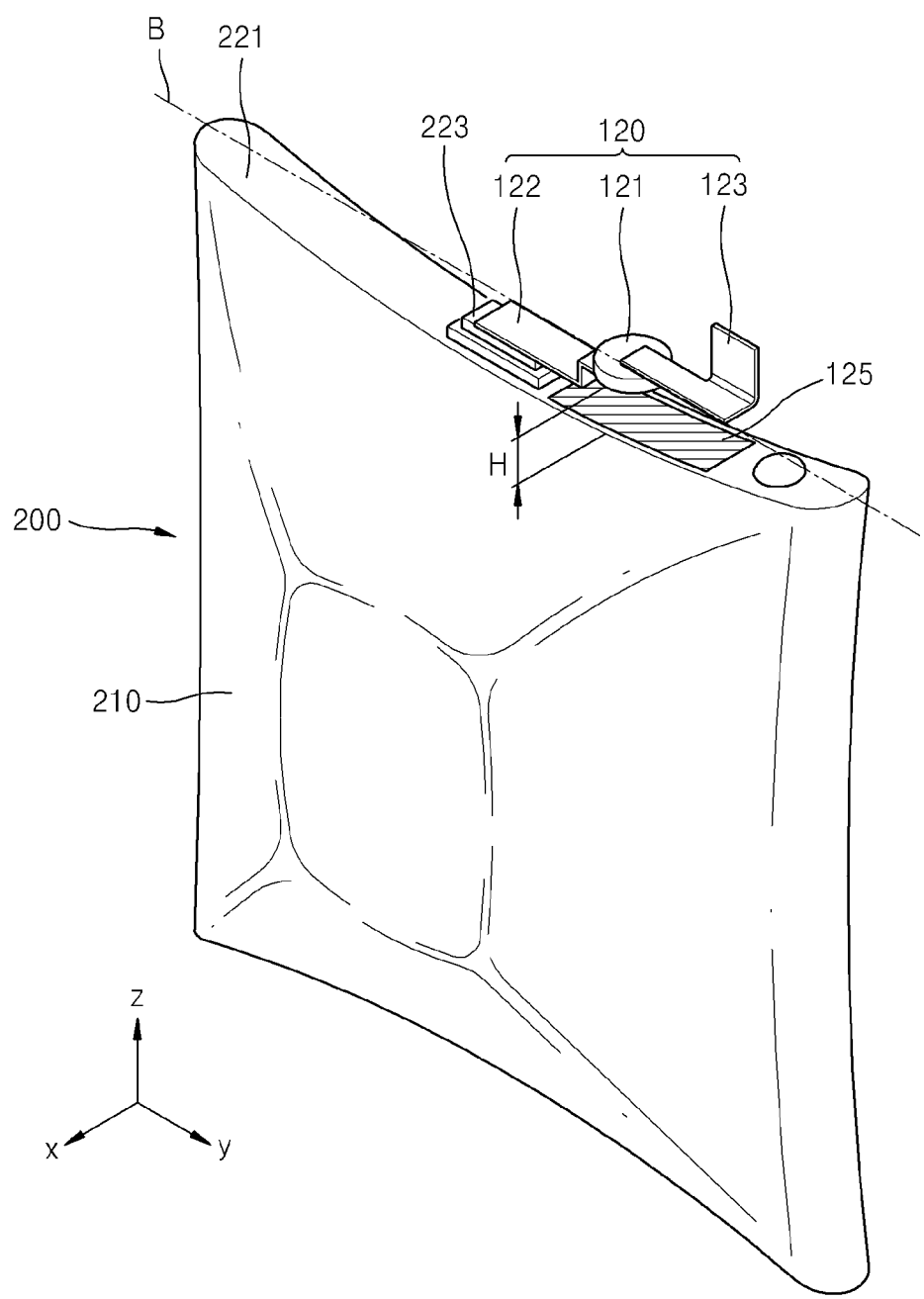
FIG. 4A illustrates a perspective view relating to a state in which a case has expanded and in which the first adhesive member of FIG. 3 is not used.
Figure 4B:
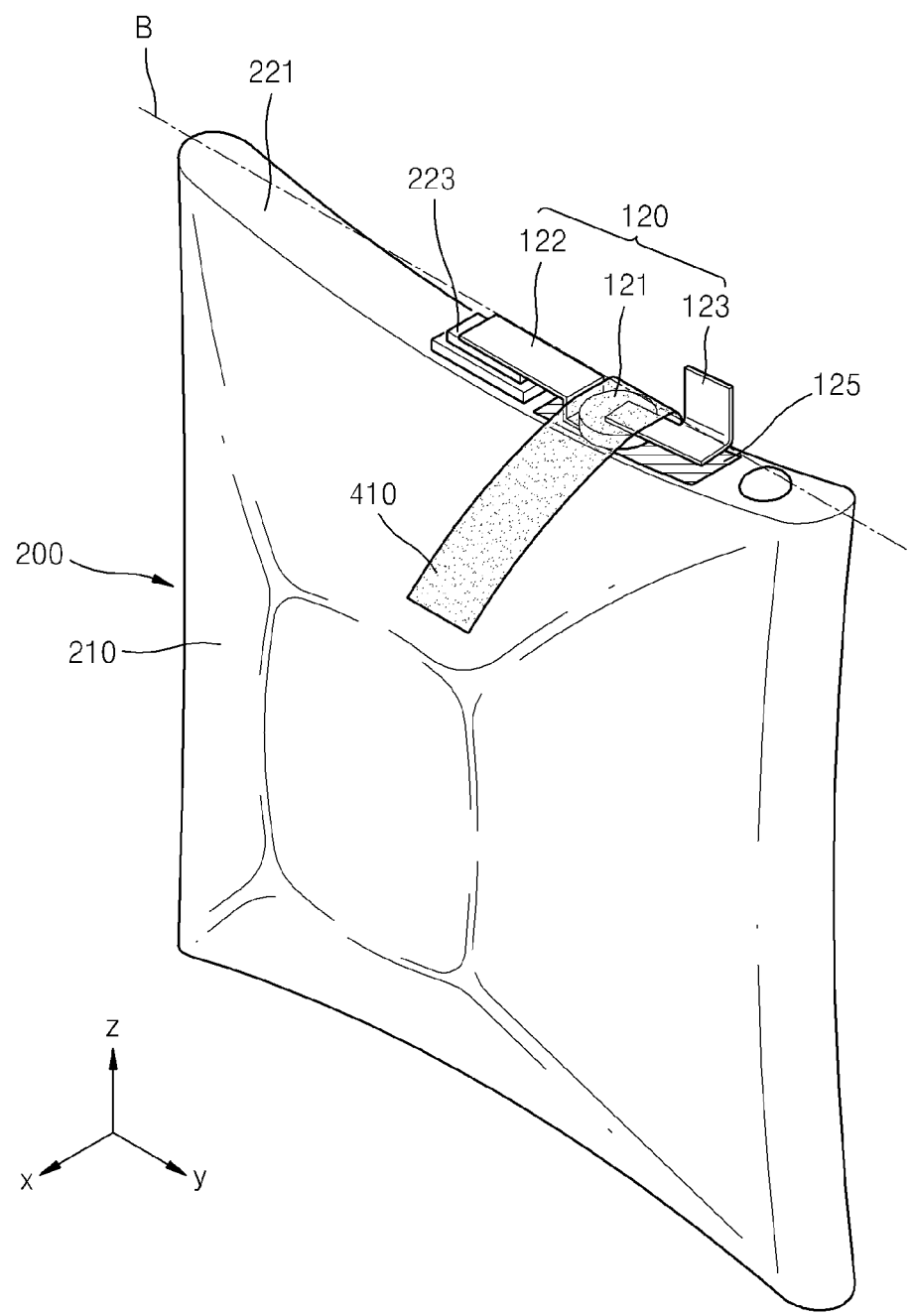
FIG. 4B illustrates a perspective view relating to a state in which the case has expanded and in which the first adhesive member of FIG. 3 is used.

The first adhesive member 410 will be described with reference to FIGS. 4A and 4B. FIG. 4A is a perspective view illustrating a state in which the case 211 has expanded and in which the first adhesive member 410 is not used. FIG. 4B is a perspective view illustrating a state in which the case 211 has expanded and in which the first adhesive member 410 is used. The case in FIGS. 4A and 4B is illustrated in an exaggerated manner for convenience of explanation. The expansion of the case 210 may be different from that described with respect to FIGS. 4A and 4B.

The bare cell 200 may be a Li-ion battery in which the case 210 may experience repeated expansion and contraction during charge/discharge. When the case 210 expands, the cap plate 221 may be bent as illustrated in FIG. 4A. A reference line B indicated as a tangent line to cap plate 221 indicates the position of the cap plate 221 before the expansion of the case 210. As the case 210 expands, the PTC main body 121 may become detached from the cap plate 210 and thus separated a predetermined distance H from the cap plate 221. Also, the second plate 123 may be fixedly connected to the protection circuit board 110. The cap plate 221 may bend according to the expansion of the case 210. In doing so, since the protection circuit board 110 maintains its shape without change, the PTC main body 121 connected to the protection circuit board 110 may gradually separate from the cap plate 221. Such a separation is disadvantageous, since the PTC device needs to contact the case 210 or the cap plate 221 of the bare cell 200 during the expansion and contraction of the case 210 in order to accurately measure the temperature of the bare cell 200. The PTC device controls current, for example, by cutting off or reducing current, with respect to a predetermined temperature; therefore an accurate measurement of the temperature of the bare cell 200 is desirable. Referring to FIG. 4B, the first adhesive member 410 may be disposed to cross a lengthwise direction of the battery protection device 120 in order for at least a part of the first adhesive member 410 to be attached to the case 210. As a result, the battery protection device 120 may be fixedly supported by the first adhesive member 410. A first end portion 410a and a second end portion 410b of the first adhesive member 410 may be disposed at side portions of the case 210. To make the battery protection device 120 contact the cap plate 221 in a direction parallel to the Z-axis, the first adhesive member 410 may be attached to the case 210 along the Z-axis and may cover a part of the battery protection device 120. The first adhesive member 410 may be arranged across the lengthwise direction of the battery protection device 120. Accordingly, contact between the first adhesive member 410 and the cap plate 221 may be improved. When the shape of the cap plate 221 is, for example, a rectangle, the cap plate 221 may include a first side extending parallel to the Y-axis and a second side extending parallel to the X-axis. To improve a spatial efficiency, the battery protection device 120 may be arranged on the cap plate 221 such that the lengthwise direction of the battery protection device 120 may be parallel to the first side of the cap plate. The first adhesive member 410 may extend in a direction crossing the first side, that is, a direction parallel to the X-axis, on the cap plate 221, and in a direction parallel to the Z-axis on the case 210, so as to make the battery protection device 120 contact the cap plate 221 in a direction parallel to the Z-axis. When the first adhesive member 410 is disposed to cross the lengthwise direction of the battery protection device 120, the direction in which the first adhesive member 410 extends and the lengthwise direction of the battery protection device 120 may be perpendicular to each other. The first adhesive member 410 may be formed of a variety of materials. For example, the first adhesive member 410 may be a polyimide tape.

Figure 5:
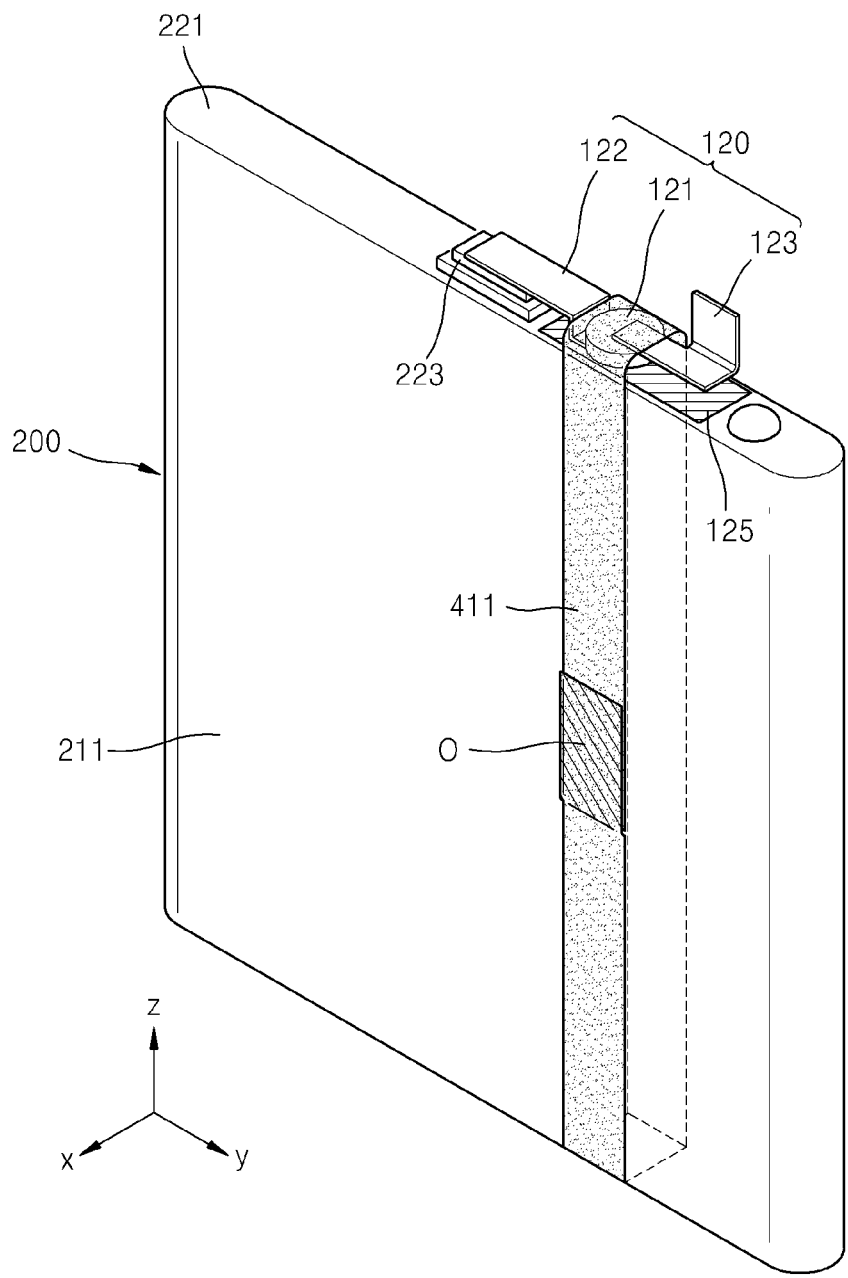
FIG. 5 illustrates a perspective view relating to a bare cell surrounded by a first adhesive member, according to a modified example of an embodiment.

Referring to FIGS. 5-8, a variety of embodiments of the battery pack 1 adopting the first adhesive member 410 of FIG. 4b will be described. FIG. 5 is a perspective view illustrating the bare cell 200 surrounded by a first adhesive member 411, according to a modified example of an embodiment. Referring to FIG. 5, the first adhesive member 411 may be attached to the case 211 by being wound around the case 211 more than once. The first adhesive member 411 may have an overlap portion O where the first adhesive member 411 overlaps itself. As such, the first adhesive member 411 may be attached not only to the case 211 but also to itself at the overlap portion O and thus the battery protection device 120 may contact the cap plate 221.

Figure 6:
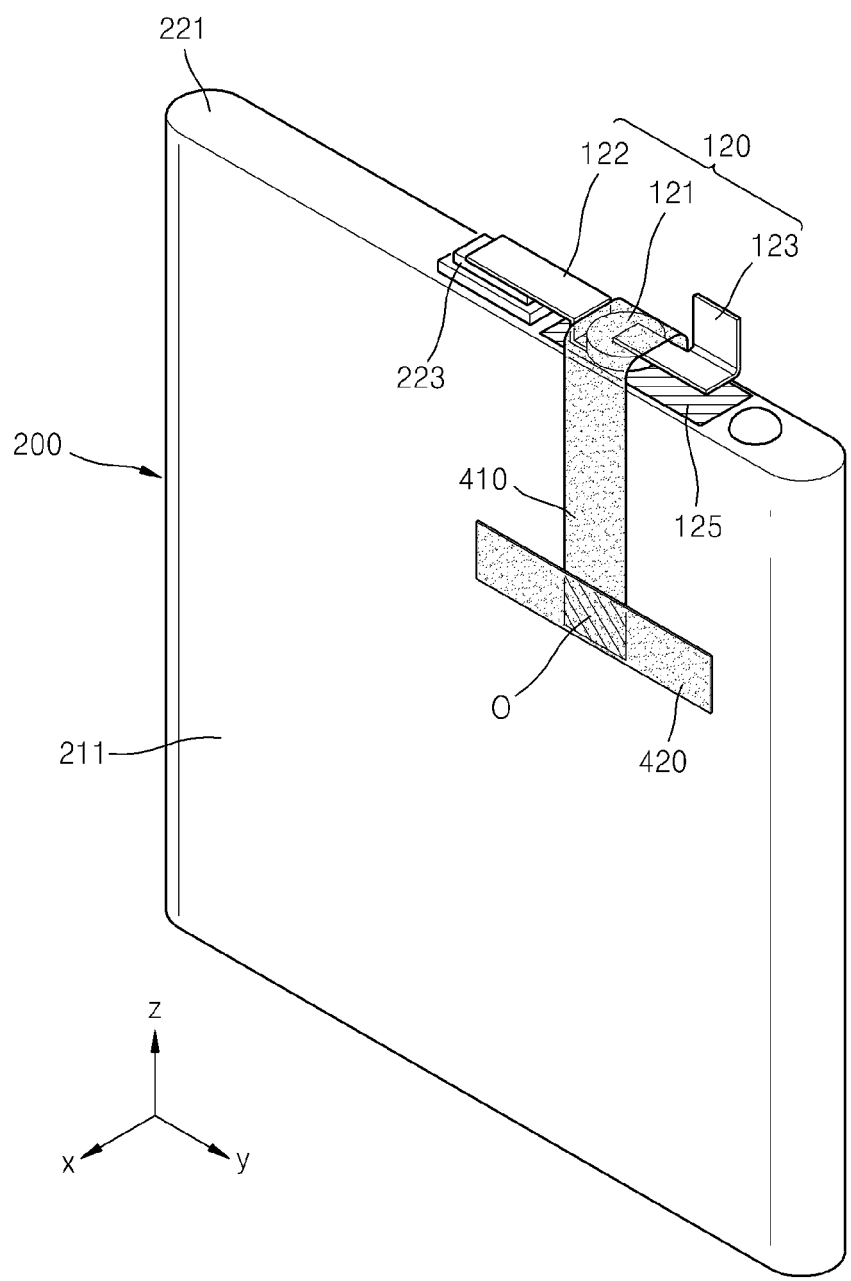
FIG. 6 illustrates a perspective view relating to a case on which a second adhesive member is attached across at least a part of the first adhesive member, according to another modified example of an embodiment.

FIG. 6 is a perspective view illustrating the case 211 on which a second adhesive member 420 is attached across at least a part of the first adhesive member 410, according to another modified example of an embodiment. The second adhesive member 420 may cross the first adhesive member 410 perpendicularly. The second adhesive member 420 may be attached to the side portions of the case 211. Accordingly, the second adhesive member 420 may resist a force applied to the first adhesive member 410 in the lengthwise direction of the battery protection device, which may be a direction parallel to the Y-axis direction. Although in FIG. 6 the second adhesive member 420 has an overlap portion O, the present invention is not limited thereto. For example, the second adhesive member 420 may be disposed in a parallel direction to the Z-axis on the cap plate 221 and may include a portion that overlaps with the first adhesive member 410.

Figure 7:
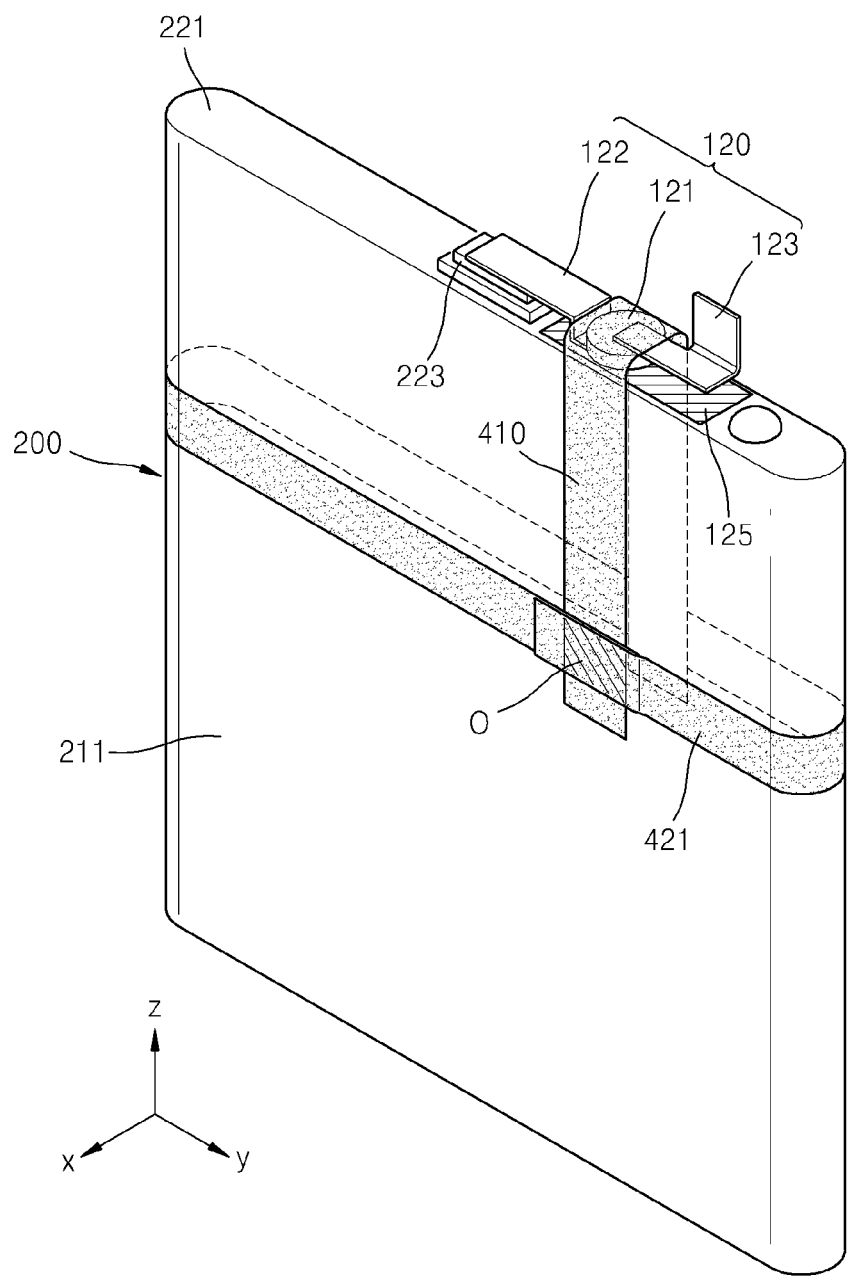
FIG. 7 illustrates a perspective view relating to the second adhesive member wound around the case more than once, according to a modified example of the embodiment of FIG. 6.

FIG. 7 is a perspective view illustrating a second adhesive member 421 wound around the case 211 more than once, crossing at least a part of the first adhesive member 410, according to a modified example of the embodiment of FIG. 6. Referring to FIG. 7, the second adhesive member 421 may wind around the case 211 one time perpendicularly to the direction in which the first adhesive member 410 extends. Since the second adhesive member 421 winds around the case 211 one time, an adhesive force between the second adhesive member 421 and the case 211 may be improved and also the first adhesive member 410 connected to the second adhesive member 421 may be supported. The second adhesive member 421 may move along the Z-axis direction.

Figure 8:
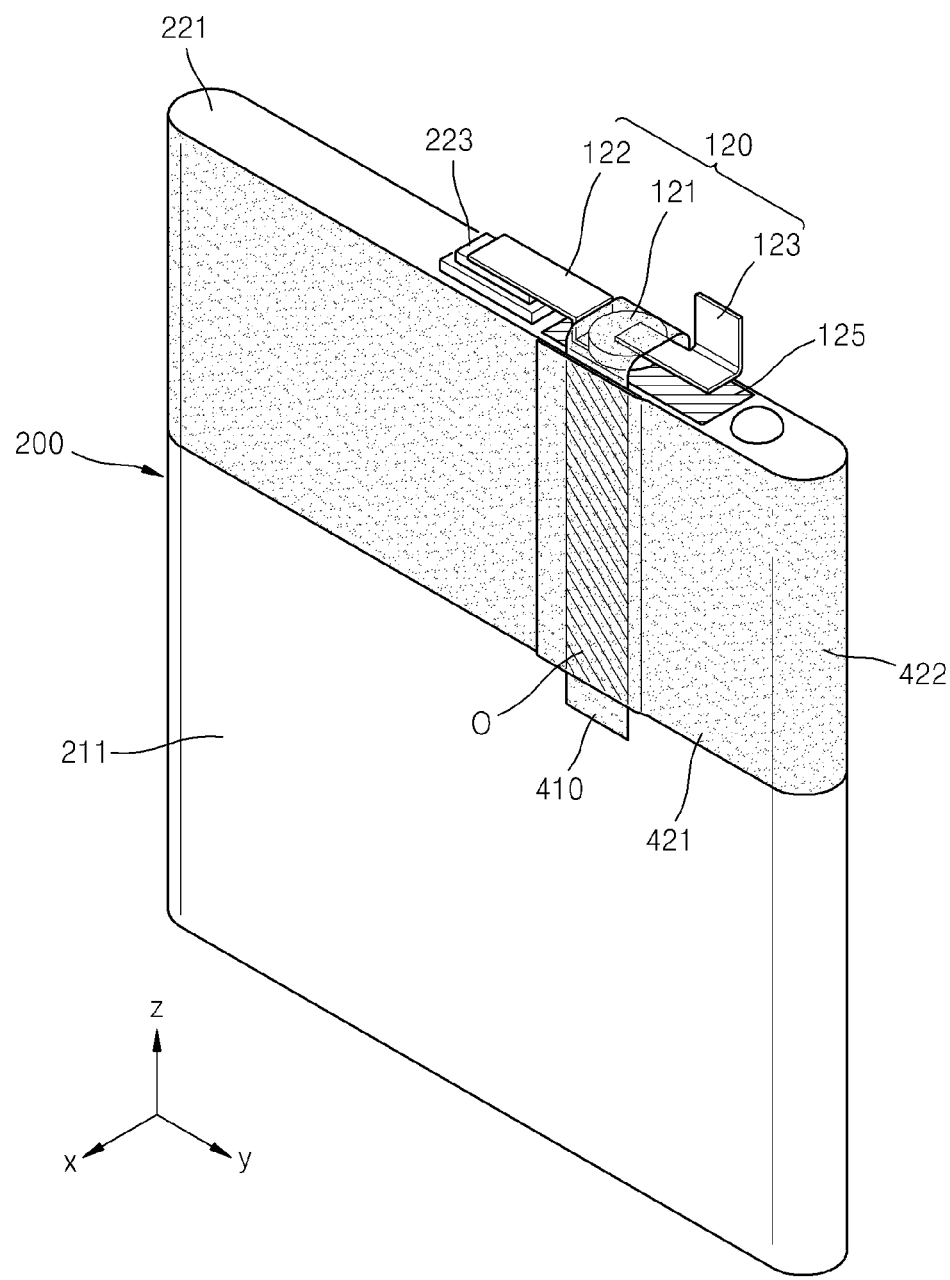
FIG. 8 illustrates a perspective view relating to the second adhesive member having an increased width and wound around the case more than once, according to another modified example of the embodiment of FIG. 6.

In FIGS. 1-7, the widths and thicknesses of the first adhesive members 410 and 411 and the second adhesive members 420 and 421 may be variously changed. For example, in FIG. 8, the width of a second adhesive member 422 may be greater than that of the first adhesive member 410. Referring to FIG. 8, for example, the second adhesive member 422 may cover a whole upper end portion of the side surfaces of the case 211 from the end portion of the first adhesive member 410 to the cap plate 221. The width of the second adhesive member 422 is not limited thereto and may be any of various widths.

Figure 9:
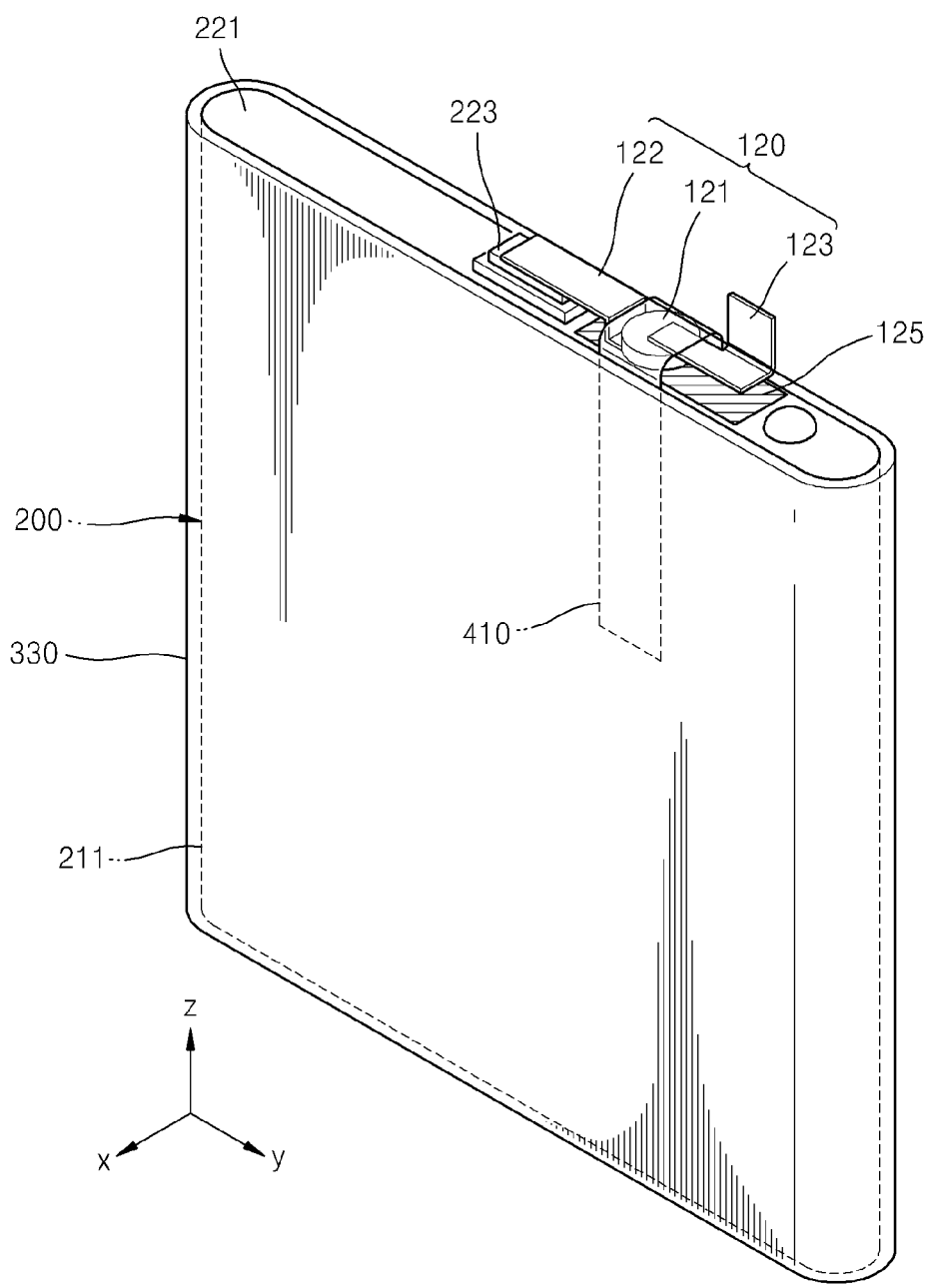
FIG. 9 illustrates a perspective view relating to a label sheet covering the first adhesive member and a side surface of the case, according to another modified example of an embodiment.

FIG. 9 is a perspective view illustrating the label sheet 330 covering the first adhesive member 410 and the side surfaces of the case 211, according to another modified example of an embodiment. The label sheet 330 may cover the side surfaces of the case 211 and simultaneously support and fix the first adhesive member 410.

A method of attaching the first adhesive member 410 to the battery protection device 120 will be described below. The battery protection device 120 may be connected to the electrode terminal 223. The battery protection device 120 may be fixedly supported on the cap plate 221 by using the first adhesive member 410. The battery protection device 120 may be connected to the protection circuit board assembly 100.

The battery protection device 120 may be connected to the protection circuit board assembly 100 and the electrode terminal 223. As such, after both ends of the battery protection device 120 are connected to the electrode terminal 223 and the protection circuit board assembly 100, the battery protection device 120 may be fixedly supported on the cap plate 221 by the first adhesive member 410. When the battery protection device 120 is a PTC device, as illustrated in FIGS. 1 and 2, the 2b region 123b may be disposed by being bent from a lateral side in a lengthwise direction of the PTC device. The bending of the 2b region 123b provides a spatial allowance so that the first adhesive member 410 may be disposed on the PTC main body 121 even when the PTC device is first connected to any one of the electrode terminal 223 and the protection circuit board assembly 100. The 2b region 123b may be elastically bent according to bending of the protection circuit board assembly 100.

Although in FIGS. 1-9 the battery protection device 120 is arranged between the cap plate 221 and the protection circuit board assembly 100, the position of the battery protection device 120 is not limited thereto. For example, the battery protection device 120 may be arranged between the protection circuit board assembly 100 and the upper cover 310. In this case, the first adhesive member 410 may be disposed such that at least a part of the first adhesive member 410 may be disposed on the case 211 crossing the lengthwise direction of the battery protection device 120.

By way of summation and review, one or more embodiments described herein include a battery pack in which contact between a bare cell and a battery protection device is improved. Accordingly, in the structure of a battery pack according to the embodiments, since the battery protection device contacts the cap plate in spite of expansion and contraction of the bare cell, the temperature of the bare cell may be accurately measured.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:
1. A battery pack comprising:
 a bare cell that includes an electrode assembly, a case for accommodating the electrode assembly, and a cap plate arranged at one side of the case;

a protection circuit board assembly for controlling charge/discharge of the bare cell;
a battery protection device electrically connected to the protection circuit board assembly; and
a first adhesive member, at least a part of which is disposed on the case and which crosses a lengthwise direction of the battery protection device, wherein the first adhesive member is a polyimide tape.

2. The battery pack as claimed in claim 1, wherein a first end portion and a second end portion of the first adhesive member are arranged on the case.

3. The battery pack as claimed in claim 1, wherein the first adhesive member winds around the bare cell more than once.

4. The battery pack as claimed in claim 1, further comprising a second adhesive member arranged on the bare cell crossing at least a part of the first adhesive member.

5. The battery pack as claimed in claim 4, wherein the second adhesive member winds around the bare cell more than once.

6. The battery pack as claimed in claim 4, wherein a width of the second adhesive member is greater than that of the first adhesive member.

7. The battery pack as claimed in claim 1, wherein the battery protection device is disposed between the cap plate and the protection circuit board assembly.

8. The battery pack as claimed in claim 1, further comprising a label sheet that winds around the bare cell to cover at least a part of the first adhesive member.

9. The battery pack as claimed in claim 1, wherein a direction in which the first adhesive member extends is perpendicular to a lengthwise direction of the battery protection device.

10. The battery pack as claimed in claim 1, wherein:
the case has a prismatic shape in which a first side thereof extends for a greater length than a second side thereof, and
the battery protection device extends in a direction in which the first side extends.

11. The battery pack as claimed in claim 1, further comprising an insulation member between the battery protection device and the cap plate.

12. The battery pack as claimed in claim 1, further comprising an electrode terminal that is electrically connected to the electrode assembly and disposed on the cap plate, wherein the battery protection device is a positive temperature coefficient (PTC) device that includes a first plate connected to the electrode terminal, a PTC main body connected to the first plate, and a second plate connected to the PTC main body and connected to the protection circuit board assembly.

13. The battery pack as claimed in claim 12, wherein the second plate comprises:
a first region extending from the PTC main body; and
a second region extending from the first region by being bent from a lateral surface in a lengthwise direction of the PTC device,
wherein the second region is connected to the protection circuit board assembly.

14. The battery pack as claimed in claim 1, wherein the battery protection device is a temperature fuse.

15. The battery pack as claimed in claim 1, further comprising an electrode terminal that is electrically connected to the electrode assembly and arranged on the cap plate, wherein one end of the battery protection device is connected to the electrode terminal and another end of the battery protection device is connected to the protection circuit board assembly, and the electrode terminal is connected to a negative polarity of the electrode assembly and one end of the protection circuit board assembly is connected to a positive polarity of the electrode assembly.

* * * * *